United States Patent [19]

Hummel

[11] Patent Number: 5,684,953
[45] Date of Patent: Nov. 4, 1997

[54] PROCESS FOR FORMING AND ANALYZING SIGNALLING MESSAGES BY STORING SIGNALLING MESSAGES INTO A BUFFER STORE AND ENTERING INFORMATION ELEMENTS BASIS INTO AN AUXILIARY ADDRESS STORE

[75] Inventor: Heinrich Hummel, Bergkirchen, Germany

[73] Assignee: Siemens Aktiengesellschaft, Munich, Germany

[21] Appl. No.: 571,817

[22] PCT Filed: Jun. 7, 1994

[86] PCT No.: PCT/DE94/00630

§ 371 Date: Dec. 28, 1995

§ 102(e) Date: Dec. 28, 1995

[87] PCT Pub. No.: WO95/01708

PCT Pub. Date: Jan. 12, 1995

[30] Foreign Application Priority Data

Jun. 30, 1993 [DE] Germany .................... 43 21 776.1

[51] Int. Cl.$^6$ .................................................. G06F 13/00
[52] U.S. Cl. ................ 395/200.01; 395/427; 395/410
[58] Field of Search ........................ 345/112; 364/200; 370/94; 395/200, 700, 200.2, 200.01, 410, 427

[56] References Cited

U.S. PATENT DOCUMENTS

| | | | |
|---|---|---|---|
| 4,503,499 | 3/1985 | Mason et al. | 364/200 |
| 4,704,717 | 11/1987 | King, Jr. | 370/94 |
| 5,073,852 | 12/1991 | Siegel et al. | 395/700 |
| 5,357,264 | 10/1994 | Itoh et al. | 345/112 |
| 5,392,402 | 2/1995 | Robrock, II | 395/200 |
| 5,490,251 | 2/1996 | Clark et al. | 395/200.2 |

FOREIGN PATENT DOCUMENTS 0 441 393  8/1991  European Pat. Off.

OTHER PUBLICATIONS

International Switching Symposium, vol. 2, No. 25, Oct. 1992, "Fast Bandwidth Allocation in ATM Networks", by D.P. Tranchier et al, pp. 7–11.

IEEE Journal of Selected Areas In Communications, vol. 11, No. 2, Feb. 1993, "ATM Receiver Implementation Issues", by T. Moors et al, pp. 254–263.

*Primary Examiner*—Thomas C. Lee
*Assistant Examiner*—David Ton
*Attorney, Agent, or Firm*—Hill, Steadman & Simpson

[57] ABSTRACT

In the initial analysis or forming of a signalling message (sm) having a message header (MK) and information elements (IE) appended thereto (for example according to CCITT recommendation Q.93B), the signalling message (sm) is buffer-stored in a buffer store ZSP to information items (ti, ki) defining the information element type and the initial addresses (sia, csia) of the information element-specific information items stored in the buffer store ZSP are entered using of an address generation routine (AGR) into an auxiliary address store (HAS). An indicative information item (hi) is transmitted to the further processing routines (WR), indicating the existence of an auxiliary address store (HAS). The buffer-stored information items (ti, csi, si) of the signalling message (sm') can be retrieved using a retrieve routine (ABR) and the auxiliary address store (HAS) by the further processing routines (WR). The process makes it possible to retrieve the buffer-stored information items (ti, csi, si) of the information elements (IE) of a signalling message (sm) to be analyzed or of a generated signalling message (sm) with rapid access, either repeatedly or, in particular, only partially.

10 Claims, 2 Drawing Sheets

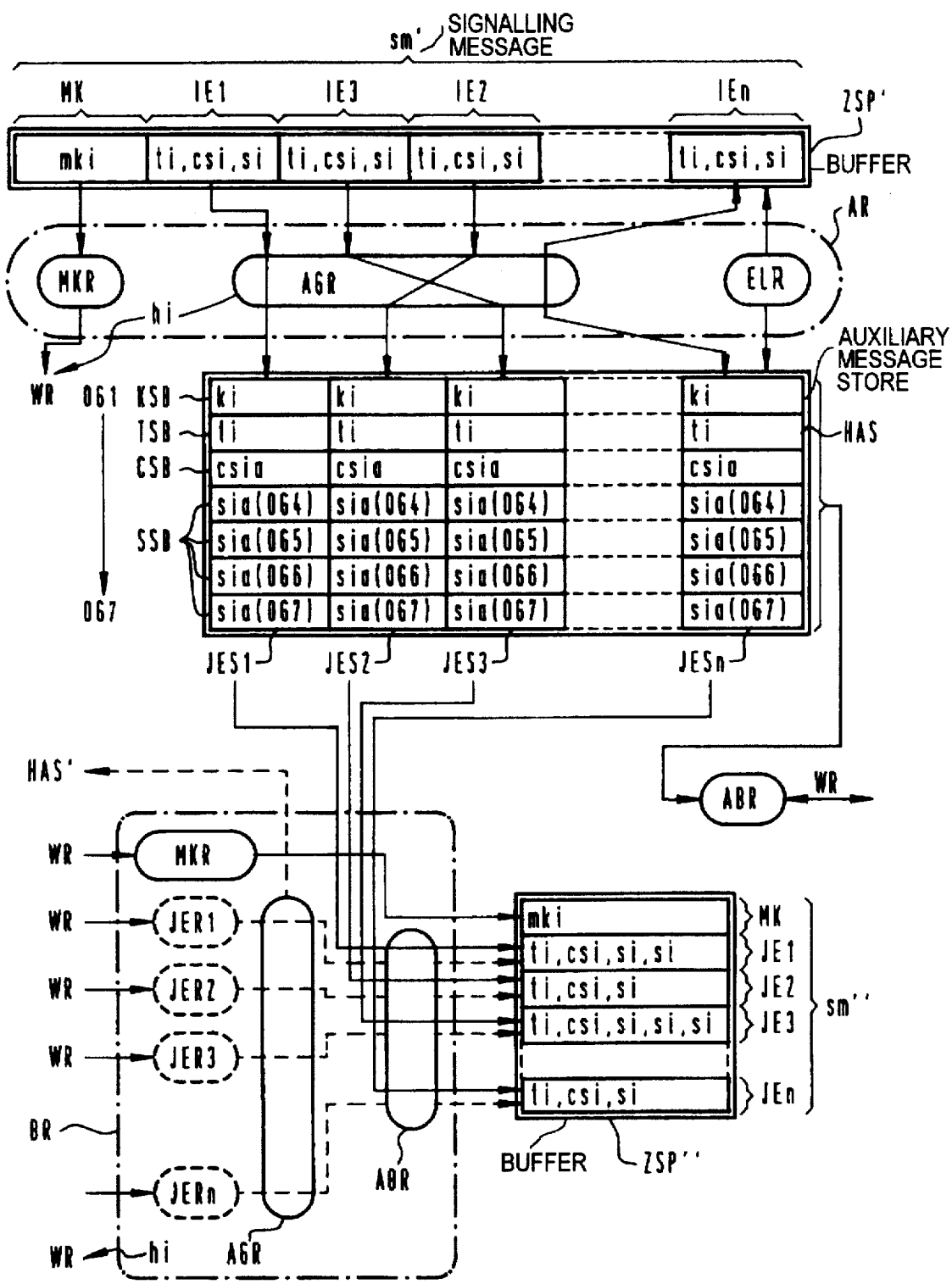

PROCESS FOR FORMING AND ANALYZING SIGNALLING MESSAGES BY STORING SIGNALLING MESSAGES INTO A BUFFER STORE AND ENTERING INFORMATION ELEMENTS BASIS INTO AN AUXILIARY ADDRESS STORE

BACKGROUND OF INVENTION

The invention relates to a process for forming and analyzing signalling messages in a program-controlled communication device, the signalling messages having message header information items and information elements appended thereto, comprising octet-oriented and information element-specific information items.

Signalling messages structured in this way are provided in particular in the case of the signalling protocols Q.931 and Q.93B standardized by the CCITT (Comitee Consultative International Telefonique e Telegrafique). In CCITT recommendation Q.931, the signalling protocol for the third protocol layer of an ISDN (Integrated Services Digital Network) basic access is defined. In analogy to this, the signalling protocol for a broadband ISDN basic access is standardized in CCITT recommendation Q.93B. Furthermore, for the signalling in communication networks acting on the basis of the asynchronous transfer mode, a signalling protocol structured in the same way is provided. In the case of these signalling protocols, each of the individual signalling messages is formed by a signalling message header and information elements appended thereto. The signalling message header has at least one protocol discriminator, indicating the signalling protocol used, a connection reference information item, serving to identify the respective connection in the local network, and a type information item, defining the type of the signalling message. Specified in the appended information item the actual signalling information elements are for the respective type of a signalling message. Each of these information elements is formed by a type information item, indicating the type of information element, a length information item, indicating the number of octets of the following signalling information items—only in the case of CCITT recommendation Q.93B—and by the appended signalling information items. According to the above-specified CCITT recommendations, both the signalling messages and the information elements are structured in an octet-based or byte-based manner. The information items contained in the message header and the information items to be inserted in the appended information elements are passed on during analysis or generation to the switching routines further processing the signalling messages or are taken over by said routines for forming a signalling message.

SUMMARY OF INVENTION

The object on which the invention is based is to design a process for analyzing and forming signalling messages explained at the beginning in such a way that the information items contained in the signalling messages to be analyzed or formed can be taken over by the switching routines in a communication device in a partial and time-independent manner.

In general terms the present invention is a process for forming and analyzing signalling messages in a program-controlled communication device. The signalling messages have a message header and information elements appended thereto, defining the information element type and comprising information element-specific information items. For each signalling message to be analyzed or formed for the first time, there is set up a buffer sore for storing the signalling message, and an auxiliary address store for storing the buffer store addresses. Using an address generation routine, the information element type and the initial addresses of the information element-specific information items buffer-stored in the buffer store are defined and entered on an information element basis into the auxiliary address store. The existence of an auxiliary address store is indicated to further processing routines of the communication device by transmitting an indicative information item.

It is to be regarded as an important aspect of the process according to the invention that, when forming or analyzing each signalling message for the first time, there is set up a buffer store, storing the signalling message, and an auxiliary address store, into which the information items defining the information element type and the initial addresses of the information element-specific information items stored in the buffer store are entered in an information element-structured form with the aid of an address generation routine. The existence of an auxiliary address store is indicated to the further processing routines—in particular the switching routines—by transmitting an indicative information item. The further processing routines retrieve the entered information items with the aid of an enquiry routine and the auxiliary address store. In this case, the information items defining the information element type is checked for the information element type being sought and, after detecting the information element type being sought, the information element-specific information items are retrieved from the buffer store with the aid of the subsequent initial addresses. By this measure, the buffer-stored information items of signalling messages, in particular for multiple connection controllers with short access times, can be retrieved as often as desired by the relevant further processing routines. The short access times are advantageously achieved by using not the type information items of the buffer-stored signalling message but the type information items entered in the auxiliary address store for checking for the information element type being sought or to be selected. When forming signalling messages, further information element routines can be employed to form information elements or information element information items, whose information items defining the information element type and the initial addresses of the information element-specific information items are entered with the aid of the address generation routine into further information element stores of the auxiliary address store. It is achieved by this measure that signalling messages and the auxiliary address store can be expanded with the aid of further information element routines.

In the signalling messages, the information items defining the type of the respective information element are represented by a type information item and the information element-specific information items are represented by signalling information items. Into the auxiliary address store there are entered on an information element basis the initial addresses of the signalling information items contained in the signalling messages and stored in the buffer store and the type information item indicating the type of the respective information element, and also a linking information item. It is indicated by this linking information item whether this information element represents the last of the current type of information elements or whether at least one further information element of the same type follows. The linking information item can be employed when there are a number of information elements of the same type to define the first information element and the sequence of the following information elements of the same type or to retrieve them in a corresponding sequence. The storing of the signalling messages to be analyzed or which have been formed in a buffer store and the setting up of an auxiliary address store, and also the entering of the information items defining the information element type and of the initial addresses of the information element-specific information items for each signalling message makes possible a selective and, in particular, repeated retrieval of the information contents of the buffer-stored information elements. By this repeated retrieval of the same information element-specific information items, the forming of voluminous communication device-internal signalling messages is avoided. In addition, the original signalling message is retained unchanged in the buffer store, for example for an acknowledgement transmission in return directions.

According to CCITT recommendations Q.931 and Q.93B, a code record information item can be inserted into an information element. According to an advantageous development of the process according to the invention, the initial address of the code record information item stored in the buffer store can be inserted into a code record store area of the respective information element store. The message record of a signalling protocol which is currently being used is defined by this code record information item, for example the message record for private branch exchanges.

Before a further processing of the signalling message entered in the buffer store this message can be checked with regard to its signalling protocol conformity. This is achieved particularly advantageously by there being stored in a test store structure for each type of signalling message and the information element contained therein signalling protocol-conformal signalling protocol information items according to the currently provided signalling protocol. Following entry of the information items defining the information element type and of the initial addresses of the buffer-stored signalling information items into the auxiliary address store by comparing the information element-specific information items and the information items defining the information element type on an information element basis with the protocol information items of the test store structure with the aid of the auxiliary address store and a checking routine, and by entering error information items into an error indication store if the signalling messages do not conform to the protocol or are incomplete. By the evaluation of these error information items, it is decided to what extent the respective signalling message has to be rejected, amended or supplemented.

For the setting up, i.e. loading and clearing of a corresponding store area for an auxiliary address store and of a buffer store, it is particularly advantageous to provide a setting-up and clearing routine. By providing such a setting-up and clearing routine, an auxiliary address store and buffer store can be set up as desired before use and, in particular, storing can be performed in any desired time period after the occurrence of a signalling message. This makes possible in a particularly advantageous way capabilities for post-processing these information items, for example in the case of multiple connections. Particularly advantageously, the above-explained buffer store and the auxiliary address store and also the setting-up and clearing routine are realized in a communication device—in particular a communication private branch exchange—by an object in an object-oriented program structure.

With the aid of a message header routine, the message header information items explained at the beginning during forming and analyzing of a signalling message and the error information items can be controlled at any desired points in time, i.e. in the case of a signalling message to be analyzed, they are separately processed, such as for example buffer-stored, evaluated and then modified.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a communication device realizing the process according to the invention and FIG. 2 shows a buffer store according to the invention and an auxiliary address store for a signalling message to be formed and a signalling message to be analyzed, and also the routines provided for this purpose.

DESCRIPTION OF THE PREFERRED EMBODIMENTS

Figure 1:
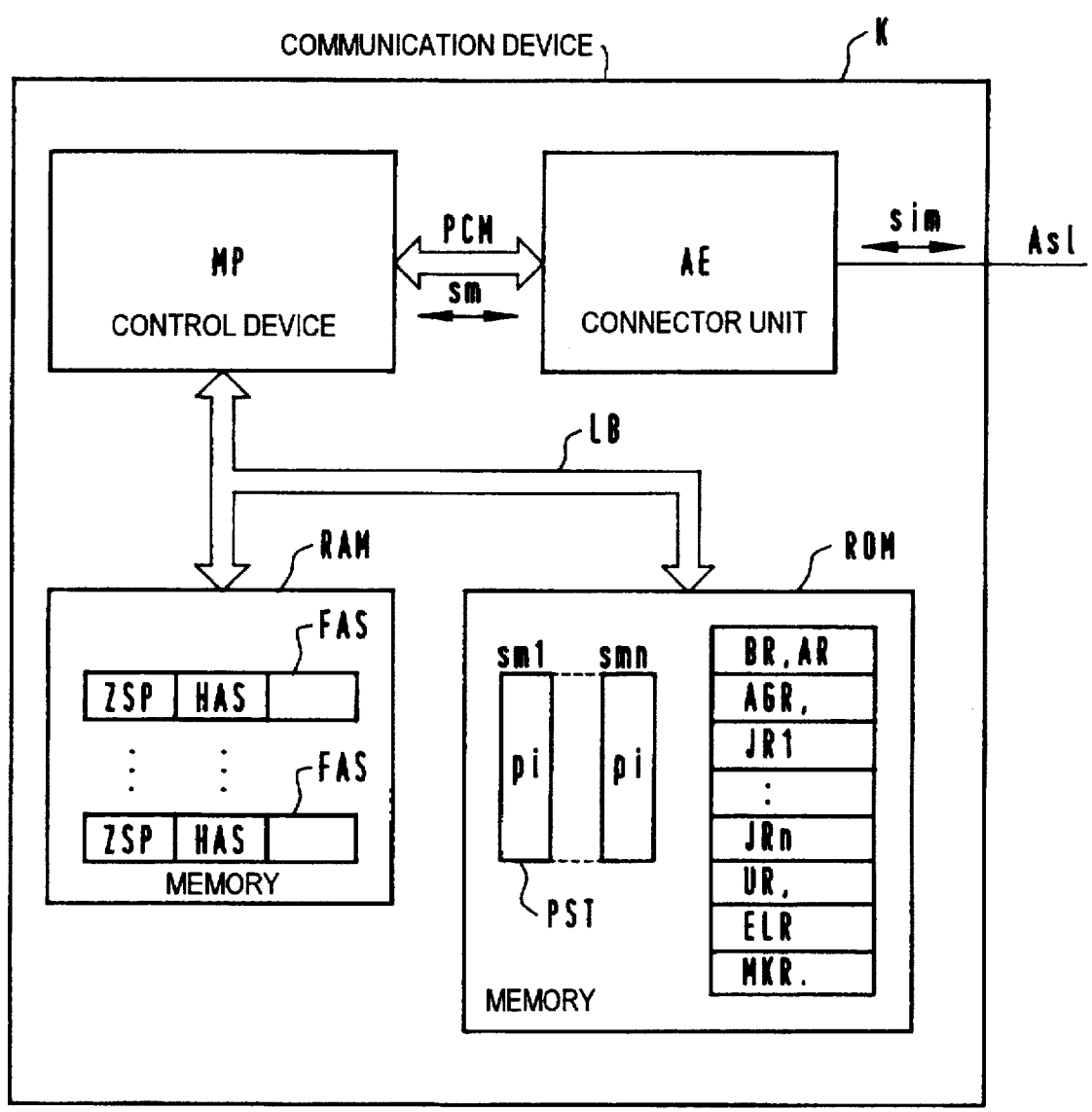

FIG. 1 shows a communication device K, in which there is arranged a control device MP controlling and monitoring the communication device K. The communication device K may represent, for example, a communication private branch exchange or a communication terminal. The control device MP is realized, for example, by a commercially available microprocessor system. This control device MP is connected via a local bus system LB, formed by, for example, control, address and data lines—not shown —, to a random-access memory RAM and a read-only memory ROM. In the read-only memory ROM there are stored the programmed routines required for carrying out the process according to the invention and the test store structure PST required for the signalling protocol conformity testing. The required routines represent an analysis or a generation routine AR, BR, an address generation routine AGR, information element routines IR1 ... IR, a checking routine UR, a setting-up and clearing routine ELR and a message header routine MKR. In the test store structure PST there are stored protocol information items pi on a signalling message-individual basis (sm1 ... n).

In the random-access memory RAM, buffer stores ZSP and auxiliary address stores HAS, including assigned error indication stores FAS, are temporarily set up with the aid of the setting-up and clearing routine ELR.

The central controller MP is connected via a further, for example PCM-oriented, internal bus system PCM to a connector unit AE. This connector unit AE is employed to perform the physical and procedural adaptations to a subscriber line ASL, which is routed for example either to a communication terminal or to a communication private branch exchange. The signalling messages sim transmitted via the subscriber line ASL pass after a physical adaptation as internal signalling messages sm to the central control device MP or are transmitted by the latter via the connector unit AE to the subscriber line ASL. For the exemplary embodiment, let it be assumed that signalling messages sm according to the signalling protocol of CCITT recommendation Q.931 are to be transmitted or formed. According to this signalling protocol, the signalling information items sm are to be transmitted in the third protocol layer of a total of seven protocol layers standardized by the OSI. The first two protocol layers, i.e. the transmission layer effecting the bit transmission, and the saving layer saving the transmission, are realized by the connector unit AE. The signalling information items inserted into the third protocol layer effect the switching of the messages to be transmitted in, for example, a communication private branch exchange. In CCITT recommendation Q.931, the structure of the signalling messages sm required for this and also the insertable signalling information items are defined.

FIG. 2 shows for a signalling message sm' to be analyzed and a signalling message sm" to be formed in each case a buffer store ZSP', ZSP", including a signalling message sm' to be analyzed and a signalling message sm" to be formed, and also an auxiliary address store HAS. A signalling message sm', sm" is formed by a message header MK and by information elements IE1 . . . n appended thereto. The sequence of the appended information elements IE1 . . . n is arbitrary. For the exemplary embodiment, let there be assumed a signalling message sm' to be analyzed such as is shown in FIG. 2.

With the aid of a setting-up and clearing routine ELR, activated by an analysis routine AR represented by dash-dotted lines, a buffer store ZSP and an auxiliary address store HAS are set up in the main memory ROM of the communication device K after detecting a signalling message sm' to be analyzed. This means that a store location made to be appropriate for the number of information elements IE1 . . . n present in the signalling message sm' is occupied and made known to the address generation routine AGR or the analysis routine AR. After storing the signalling message sm' in the buffer store ZSP', the message header information mki inserted in the message header MK is sent for the purposes of further processing or evaluation to the relevant further processing routines WR with the aid of a message header routine MKR initiated by the analysis routine AR. The message header information items mki contain a protocol discriminator, indicating the signalling protocol used—in the exemplary embodiment for example the signalling protocol according to CCITT recommendation Q.931—a connection reference information item, serving to identify the respective connection in the local network, and a type information item, defining the type of the signalling message—for example a connection setup message.

Subsequently, with the aid of the address generation routine AGR, the information items ti, defining the information element type, and the initial addresses a of the information element-specific information items csi, si are entered on an information element basis into the auxiliary address store HAS, i.e. are stored there. Specifically concerned here are a type information item indicating the type of the respective information element IE1 . . . n, initial addresses sia of information element-specific signalling information items si and a code record information item csia indicating the currently applicable message record—for example a message record for private branch exchanges. In addition, a linking information item ki, defining the linking of the information elements IE1 . . . n, is formed by the address generation routine AGR and is entered into the auxiliary address store HAS.

For the entry of the above-explained information items ti, ki, defining the information elements IE1 . . . n, and the initial addresses sia, csia, the signalling information items csi and the code record information items si, each information element IE1 . . . n is assigned an information element store IES. Each of the information element stores IES has for the linking information items ki, a linking store area KSB, for the type information items ti, a type store area TSB, for the initial address csia of the code record information items csi stored in the buffer store ZSP, a code record store area CSB, and for the initial addresses sia of the signalling information items si stored in the buffer store ZSP, a plurality of signalling information store areas SSB.

The information element store IES is, furthermore, structured on an octet basis, i.e. a group OG of octets or bits is provided for each of the above-explained store areas KSB, TSB, CSB, SSB. Thus, in the case of the exemplary embodiment by way of example, there are provided for the linking information item ki, the type information item ti and the initial addresses csia, cia of the code record information item csi and the signalling information items si in each case a group OG of octets, i.e. altogether seven groups OG1 . . . 7. As a result, an initial address specification can be given in the number of octets, starting from the first octet of a signalling message sm' in the buffer store ZSP'.

With the aid of a programmed enquiry routine ABR, the buffer-stored information items ti, csi, si of the individual information elements IE1 . . . n can be retrieved selectively or multiply by the further processing routines and be further processed. This is effected by the type store areas TSB being checked for the relevant type information item ti by the enquiry routine ABR in the auxiliary address store HAS according to the information type to be selected and, after finding the information type to be selected, reading, i.e. enquiring, the assigned code-record and signalling information item csi, si, from the buffer store ZSP' with the aid of the initial addresses csia, sia, it being possible if there are a number of information elements IE1 . . . n of the same type with the aid of the linking information item ki to define the first and last information element IE1 . . . n of the same type and enquire them in a corresponding sequence.

Furthermore, the information items ki, ti, csia, sia stored in the auxiliary address store HAS can be provided for the forming of a signalling message sm". This is the case in a communication device K whenever a received signalling message sm' is to be passed on in approximately unchanged form, but also in modified form, to a further communication device KE. Provided for the forming of such a signalling message sm" in a further buffer store ZSP" is the enquiry routine ABR, initialized by a formation routine BR—defined by dash-dotted lines. The formation routine additionally has a message header routine MKR, with the aid of which, for example, message header information items mki retrieved by a further routine WR or the message header MK are inserted into the signalling message sm" in the buffer store ZSP. With the aid of the enquiry routine ABR and the respective auxiliary address store HAS, the information items ti, csi, si stored in the buffer-stored signalling message sm' are inserted into the respective regions of the information elements IE1 . . . n of the signalling message sm" to be formed in the further buffer store ZSP". It is indicated by the different number of signalling information items si in the respective information elements IE1 . . . n that only those information contents of the signalling information items si for which initial addresses a are entered in the auxiliary address store HAS are inserted into the signalling message sm" to be formed.

In this forming of the signalling message sm", essentially the initial addresses a stored in the auxiliary address store HAS are used to copy the information element-individual information items ti, csi, si stored in the buffer store ZSP' into a further buffer store ZSP", setup for the signalling message sm" to be formed. If, however, there are no information items ki, ti, csia, sia stored in the auxiliary address store HAS, i.e. a signalling message sm" is being formed for the first time, the information element-specific information items ti, csi, si are formed with the aid of information element routines IER1' . . . n' provided for this and, subsequently, both combined to form a signalling message sm" in the buffer store ZSP" and the information items ti, ki, defining the information element type, and the initial addresses of the information element-specific information items csia, sia, stored in the buffer store ZSP, are entered into a further auxiliary address store HAS'.

After the forming or analyzing of a signalling message sm', sm", the buffer store ZSP, setup in the main memory RAM in the communication device K, and the auxiliary address store HAS are released for other use.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed:

1. A process for forming and analyzing signalling messages in a program-controlled communication device, the signalling messages having a message header and information elements appended thereto, defining an information element type and having information element-specific information items, comprising the steps of:

setting up, for each signalling message to be analyzed or formed for a first time, a buffer store for storing a signalling message, and an auxiliary address store for storing buffer store addresses;

defining and entering, on an information element basis into the auxiliary address store, using an address generation routine the information items that define a respective information element type and initial addresses of the information element-specific information items that are buffer-stored in the buffer store;

transmitting an indicative information item that indicates the existence of an auxiliary address store to further processing routines of the communication device.

2. The process as claimed in claim 1, wherein the information item defining the information element type is represented by a type information item and the information items defining the information element-specific information items are represented by signalling information items, wherein, the auxiliary address store has an information element store which is assigned to each information element wherein a linking information item defining the linking of the information elements is entered into a linking store area of the information element store, wherein the type information item is entered into a type store area of the information element store, wherein the initial addresses of the octet-oriented groups of signalling information items stored in the buffer store are stored into signalling information store areas of the information element store.

3. The process as claimed in claim 1, wherein an information element-specific information item is represented by a code record information item indicating the current message record, and wherein there is entered into a code record store area of the respective information element store the initial address of the code record information items stored in the buffer store.

4. The process as claimed in claim 1, wherein the linking information item is formed by an information item indicating a last information element of a same type or at least a following information element of a same type.

5. The process as claimed in claim 1, wherein there are stored in a test memory structure, for each type of signalling message and the information elements contained therein, signalling protocol-conformal protocol information items according to a currently provided signalling protocol, wherein, following entry of the information items into the auxiliary address store, the information items of the buffer-stored signalling message are compared on an information element basis with the entered protocol information items of the test store structure using a checking routine and the auxiliary address store, and error information items are entered into an error indication store if signalling messages do not conform to the protocol or are incomplete.

6. The process as claimed in claim 1, wherein the information items of the signalling message are retrieved by further processing routines using a retrieve routine and the auxiliary address store.

7. The process as claimed in claim 1, wherein, when forming signalling messages, further information element routines and the address generation routine are used to supplement the signalling message stored in the buffer store by further information elements and in the set-up auxiliary address store by further information items which are entered into information element stores.

8. The process as claimed in claim 1, wherein, for a setting up or clearing of a buffer store and an auxiliary address store, a setting-up and clearing routine is provided.

9. The process as claimed in claim 1, wherein, using a message header routine, the message header information items, contained in the message header of a signalling message, and also the error information items are controlled.

10. The process as claimed in claim 1, wherein the signalling messages and their information elements are structured according to CCITT recommendations Q.931 and Q.93B.

* * * * *